(12) United States Patent
Laurent

(10) Patent No.: US 6,418,127 B1
(45) Date of Patent: Jul. 9, 2002

(54) POWER CONSUMPTION REDUCTION METHOD IN A DIGITAL MOBILE RADIO SYSTEM AND A MOBILE RADIO STATION

(75) Inventor: Eric M. F. Laurent, Caen (FR)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/252,702

(22) Filed: Feb. 18, 1999

(30) Foreign Application Priority Data

Feb. 20, 1998 (EP) .......................................... 98400422

(51) Int. Cl.⁷ .............................................. G08C 17/00
(52) U.S. Cl. ........................................ 370/311; 455/574
(58) Field of Search ................................ 370/478, 311, 370/321, 326, 329, 341, 347, 337, 328, 332, 336, 345, 348; 455/68, 574, 134, 136, 138, 226.1, 266.2, 230

(56) References Cited

U.S. PATENT DOCUMENTS 5,745,523 A * 4/1998 Dent et al. .................. 375/216
5,883,885 A * 3/1999 Raith .......................... 370/311
5,950,120 A * 9/1999 Gardner et al. ............. 455/343
5,999,830 A * 12/1999 Taniguchi et al. .......... 455/574

OTHER PUBLICATIONS

By Etsi, GSM Digital Cellular Telecommunications Sytem (Phase 2); Radio Sybsystem Link Control (GSM 05.08), Nineth Edition, Mar. 1997, pp. 2–37.

By S. Redl et al. An Introduction to GSM, Artech House, Publiished 1995, pp. 71–11, 165–164.

* cited by examiner

Primary Examiner—David Vincent
Assistant Examiner—Phirin Sam
(74) Attorney, Agent, or Firm—Harold Tsiang

(57) ABSTRACT

In a power consumption method for a mobile radio station in a digital mobile radio system, measurements are squeezed in earlier frames of a paging block thereby avoiding that measurements of neighbor cell BCCH carriers are performed in the last frame of the paging block, thus allowing the mobile radio station to adopt a power down mode at an earlier instant.

5 Claims, 3 Drawing Sheets

POWER CONSUMPTION REDUCTION METHOD IN A DIGITAL MOBILE RADIO SYSTEM AND A MOBILE RADIO STATION

BACKGROUND OF THE INVENTION

1. Field of the Invention

The present invention relates to a power consumption reduction method in a mobile radio system.

2. Description of the Related Art

Such a power consumption reduction method is described in Chapter 6.6 and 6.6.1 of the Draft European Telecommunication Standard ETS 300 578, Ninth Edition, March 1997 as published by ETSI, "GSM Digital cellular telecommunications system (Phase 2); Radio subsystem link control (GSM 05.08)". Generally, in digital mobile radio systems, such as a GSM system, RF power control is employed to minimize the transmit power required by a mobile or a base station subsystem whilst maintaining the quality of the radio links. By minimizing the transmit power levels, interference to co-channel users is reduced. Moreover, in a mobile it is important to save power because increased battery life increases call times and standby times. For the latter reason, manufacturers of mobiles are continuously striving to reduce power consumption in mobiles. In Chapter 6.6 of said ETSI document, it is prescribed that a mobile, whilst in idle mode, upon completion of cell selection and when starting the cell reselection tasks, shall synchronize to and read the BCCH information for the 6 strongest non-serving carriers as quickly as possible. Such non-serving carriers usually are assigned to neighbour cells, but can also be assigned to the serving cell. For multi band mobiles the strongest non-serving carriers may belong to different frequency bands. Such BCCH information is broadcast via BCCH carriers. In GSM, radio frequency channels are defined, and numbers are allocated to all the radio frequency channels available to the system. Each cell is allocated a subset of these channels, defined as the cell allocation. The BCCH carrier is a special radio frequency channel of the cell allocation which is used to carry synchronization information and said general information, including the organization of the so-called common control channels such as paging channels, random access channels, and access grant channels used for setting up radio links between mobiles and the GSM network. In Chapter 6.6.1, such monitoring of non-serving cell BCCH carriers, whilst the mobile is in idle mode, is described in more detail. In order to minimize-power consumption, mobiles that employ DRX (Discontinuous Reception) (i.e. power down when paging blocks are not due) should monitor the signal strength of non-serving cell BCCH carriers during the frames of the paging block that they are required to listen to. The mobile shall include the BCCH carrier of the current serving cell (i.e the cell the mobile is camped on) in this measurement routine. Received level measurement samples can thus be taken on several non-serving cell BCCH carriers and on the serving carrier during each paging block. So, in the described system, a mobile employing DRX should perform at least 7 power measurements per paging block. Typically, a paging block comprises 4 frames, and usually a mobile can perform 2 mmeasurements on non-serving carriers per frame. In the given example, the mobile can thus only adopt a power down mode after the 4$^{th}$ frame.

SUMMARY OF THE INVENTION

It is ad object of the present invention to provide a power consumption reduction method in a mobile radio system whilst a mobile radio station is in idle mode and is performing monitoring of carriers of non-serving cells, in which the power measurements during paging blocks are speeded up.

To this end a power consumption reduction method is provided for use in a mobile radio station in idle mode and included in a digital mobile system including frequency and time division radio resources, which system comprises at least one radio base station and a plurality of mobile radio stations, which method comprises:

a) broadcasting to the mobile radio station of system messages informing the mobile radio station about the structure of control channels which include paging channels, b) powering up of the mobile radio station at a start of a block of paging channels intended for it, which block extends over more than one time division multiple access frame, and is a part of a multiframe structure including at least two blocks of paging channels which are timely separated for the same mobile radio station, c) monitoring by the mobile radio station of broadcast channel carriers of its serving cell and a number of broadcast channel carriers of non-serving neighbor cells, by measuring receive field strengths thereof, d) carrying out of non-uniformly spread field strength measurements during the frames preceding a last frame of the intended paging block, and e) powering down of the mobile radio station at least one time slot earlier than would have been needed if the measurements were uniformly spread over the intended paging block.

Herewith, it is avoided that power measurements are done in the last frame of the paging block so that the mobile can adopt a power down state within the shortest possible time. Thus, in this phase, optimum power consumption reduction is achieved.

The present invention is based upon the insight that full advantage can be taken of the fact that less severe demands are to be put on synthesizer stabilization when performing carrier monitoring as compared to tasks such as equalization. So, more carrier measurements can be squeezed in one frame. Furthermore, is was realized, that anyhow the last paging block should be read but that it should be avoided to do carrier measurements during the last frame of the paging block.

In an embodiment of the invention, during a given frame before the last frame of the intended paging block more field strength measurements are carried out than in other frames before the last frame. The additional measurement or measurements can thus be spread over frames preceding the last frame of a paging block.

BRIEF DESCRIPTION OF THE DRAWINGS

The present invention will now be described, by way of example, with reference to the accompanying drawings, wherein FIG. 1 schematically shows a digital mobile radio system according to the present invention.

DETAILED DESCRIPTION OF THE INVENTION

Figure 1:
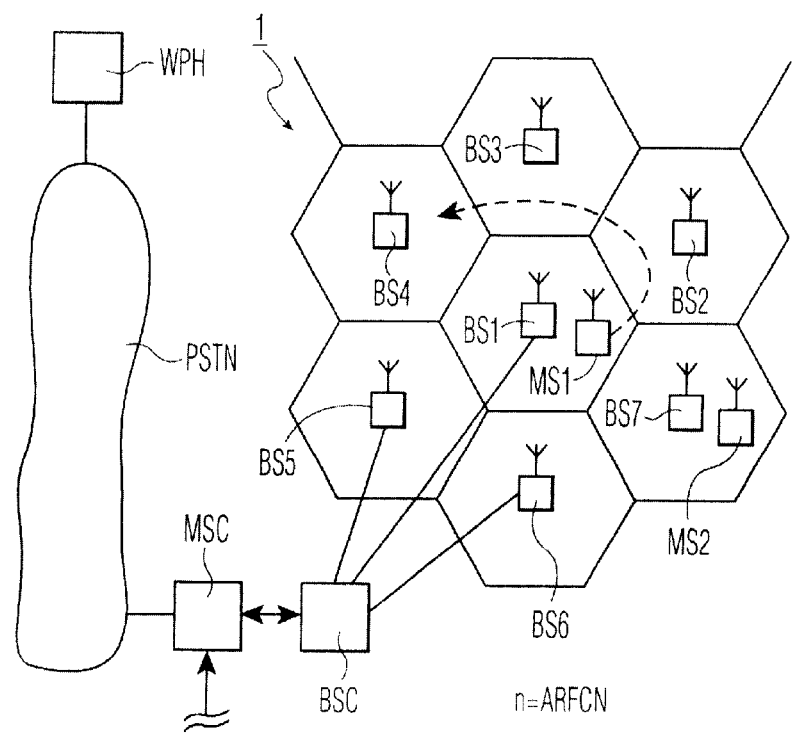

FIG. 1 schematically shows a digital mobile radio system 1 according to the present invention comprising a number of base stations BS1, BS2, BS3, BS4, BS5, BS6 and BS7 serving mobile radio stations in radio cells or zones they cover. The cells are indicated as hexagonal structures. Mobile radio stations MS1 and MS2 are shown in FIG. 1. The mobile radio station is near the radio base station BS1 so that most likely BS1 is the serving base station and BS2 to BS7 are neighbouring base stations or most likely non-serving base stations. A dashed line from the mobile radio station MS1 indicates that the mobile radio station MS1 may roam through the mobile radio system 1. When the mobile radio station MS1 is roaming, another base station may become the serving station. Further shown is a base station controller BSC which is coupled to a number of base stations, in the example given the radio base stations BS1, BS5 and BS6. The base station controller BSC is coupled to a mobile switching centre MSC to which further base station controllers can be coupled. Some mobile switching centres have a gate to a public switched telephone network PSTN of fixed network subscribers such as the wired phone WPH. To the fixed network PSTN also other mobile phone systems may be coupled. Mobile phone systems operated by different operators may cover geographically disjunct or overlapping areas, and may share the same frequency band or operate in different frequency bands. Frequencies are allocated to different operators such that, in principle, the various systems do not interfere with each other. Such a digital mobile radio system 1 can be a GSM system operating in the 900 MHz band and/or a DCS 1800 system operating in the 1800 MHz band or any combination of systems operated by the same or by different operators. In the example given, the mobile radio system is a GSM and/or DCS 1800 system and/or PCS (A US variant of DCS 1800 operating in the 1900 MHz band), so that the system can be a single, a dual or a triple band system. Another combination is E-GSM (extended GSM)+DCS 1800+PCS. A GSM system as standardised by ETSI (European Telecommunications Standards Institute), is a digital mobile radio system having two 25 MHz bands, an 890–915 MHz uplink band in which mobiles transmit to the network, and a 935–960 downlink band in which base stations transmit to mobiles, frequency channels within these bands having a 200 kHz bandwidth. Radio communications between mobiles and base stations is full duplex with a 45 MHz duplex spacing. The GSM system has 124 active frequency channels which have been given absolute radio frequency channels numbers ARFCN. Herewith, the frequencies in the uplink and downlink bands are defined as 890 MHz+0.2 MHz * n, and the frequency of the uplink channel+45 MHz, respectively. A radio cell usually has between 1 and 16 frequencies which can be assigned to a mobile in a cell on an FDMA basis (Frequency Division Multiple Access). In so-called E-GSM (Extended GSM), there are 174 frequency channels. In DCS 1800, the uplink occupies a 1710–1785 MHz band, and the downlink an 1805–1880 MHz band, the duplex spacing being 95 MHz. With a frequency channel bandwidth of 200 MHz, DCS 1800 has 374 frequency channels. To distinguish from GSM and E-GSM, DCS 1800 has ARFCNs in a range 512 to 885. In all these systems, physical radio channel resources are allocated on an FDMA and TDMA (Time Division Multiple Access) basis. In TDMA, each frequency is further subdivided into eight different time slots numbered from 0 to 7, each of which can be assigned to a mobile phone subscriber or user. A set of eight time slots form a physical frame, in GSM having a duration of 4.615 msec. For a more detailed description of a GSM system, referred is to the handbook "An Introduction to GSM", S. M. Redl et al., Artech House, Inc., 1995, pp. 71–77, 86–100, 111, and 163–165.

Figure 2:
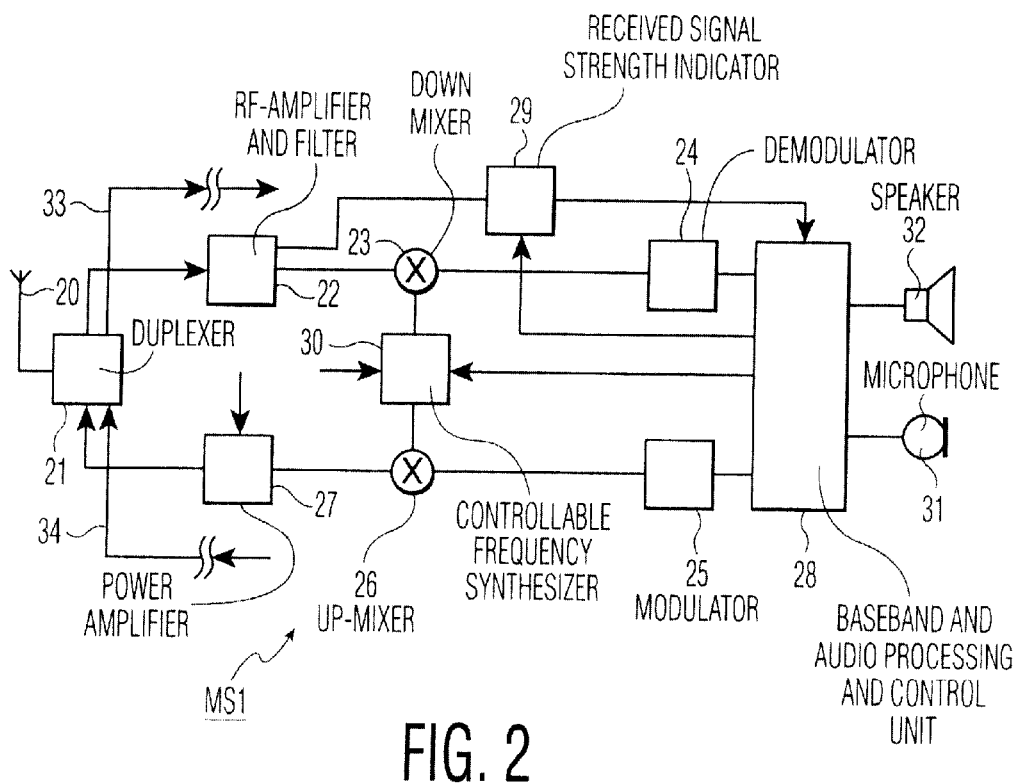
FIG. 2 shows a block diagram of a mobile radio station according to the present invention.

FIG. 2 shows a block diagram of the mobile radio station MS1 according to the present invention. The mobile radio station MS1 comprises an antenna 20 which is coupled to a receive path and a transmit path via a duplexer 21. The receive path comprises an RF-amplifier and filter 22, a down-mixer 23 and a demodulator 24, and the transmit path comprises a modulator 25 an up-mixer 26, and a power amplifier 27. The demodulator and modulator 24 and 25 are coupled to a baseband and audio processing and control unit 28 comprising components such as a digital signal processor, programmed memory and random access memory, input/output ports for controlling components in the mobile radio station MS1, and other processing capabilities well known in the art. Further shown are a received signal strength indicator 29 for measuring the field strength of the received radio channel, the indicator 29 being coupled between the radio part and the control unit 28, a controllable frequency synthesizer 30 for adjusting a desired radio channel, a microphone 31 and a speaker 32. With further receive and transmit path 33 and 34, having a similar construction as the described receive and transmit path, it is indicated that the mobile radio station can be a multi-band station, e.g. a dual band station being able to receive GSM and DCS 1800 signals or a triple band station being able to receive signals from three different systems. In the mobile station MS1, integrated circuits and other circuits comprising the shown blocks may be powered down by the unit 28 so as to reduce power consumption. In the sequel, power consumption reduction according to the present invention will be described.

Figure 3:
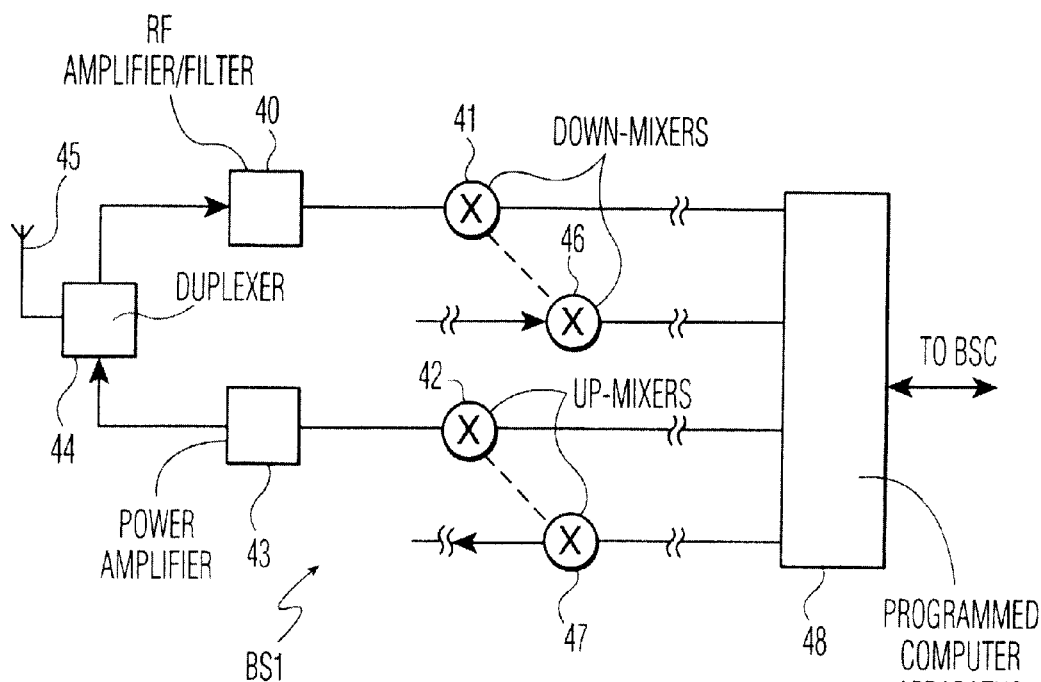
FIG. 3 shows a block diagram of a radio base station.

FIG. 3 shows a block diagram of the radio base station BS1 comprising a number of transceivers of which one transceiver is shown in more detail. The shown transceiver comprises a receive path comprising an RF amplifier/filter 40 and a down-mixer 41, and a transmit path comprising an up-mixer 42 and a power amplifier 43, the amplifier/filter and the power amplifier being coupled to a duplexer 44 which is further coupled to an antenna 45. Further mixers and 47, and dashed lines between mixers indicated a repetition of the same transceiver structure. All mixers are coupled to a programmed computer apparatus 48 via demodulators and modulators (not shown in detail), the apparatus 48 being programmed such as to carry out well-known signalling tasks in the GSM system, and base station internal control tasks.

Figure 4:
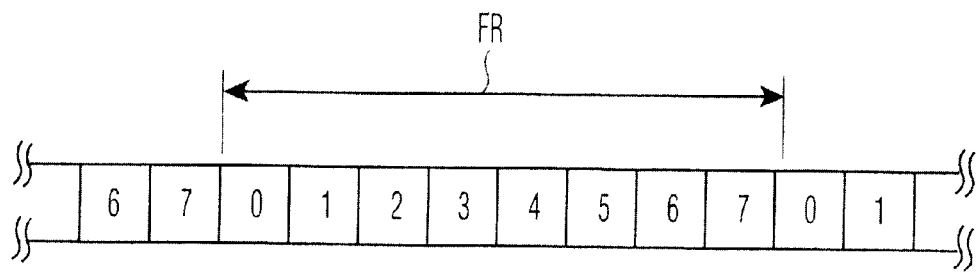
FIG. 4 shows a TDMA frame.

FIG. 4 shows a TDMA frame FR. In the example given, a time slot numbered 1 is assigned to a mobile radio station. To save power, the mobile at least switches off its transmitter during intermediate time slots numbered 2 to 7 and 0. In GSM, uplink and downlink time slots are offset by three slots. Herewith, full duplex operation is achieved on a TDD basis (time division duplex). The described physical FDMA/TDMA channels structure of frequencies and time slots is the conveying means for conveying logical traffic and control data.

Figure 5:
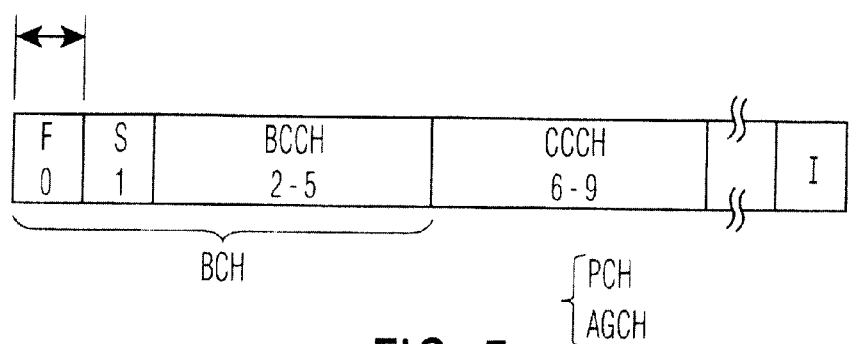
FIG. 5 shows a combination of logical channels to be conveyed via a physical channel.

FIG. 5 shows a combination of logical channels to be conveyed via a physical channel. The logical channels, traffic and control channels, are mapped onto the shown physical channels. Shown is an 51 frames multi-frame signalling frame of a logical channel combination conveyed on a physical channel in the downlink direction. For initial synchronisation of a mobile to the mobile radio network, the 51-multi-frame a frequency correction channel F in frame numbered 0, and a synchronisation channel in the succeeding frame. Frames 2–5 carry BCCH data, system messages broadcast from a radio base station to mobiles, and frames 6–9 carry common control channels, such as paging channels PCH for paging a mobile, and access grant channels to grant a dedicated signal to a mobile upon request. After frequency and time synchronisation to the network, a mobile reads system and cell data from the BCCH. The shown 51-multi-frame can be transmitted on any frequency available to a cell, but is always transmitted on a time slot numbered 0. Herewith, a mobile can always easily find synchronisation information and system broadcast messages. The frequency on which this combination is transmitted is used as a reference in the neighbouring cells to mark it as an adjacent cell.

Figure 6:
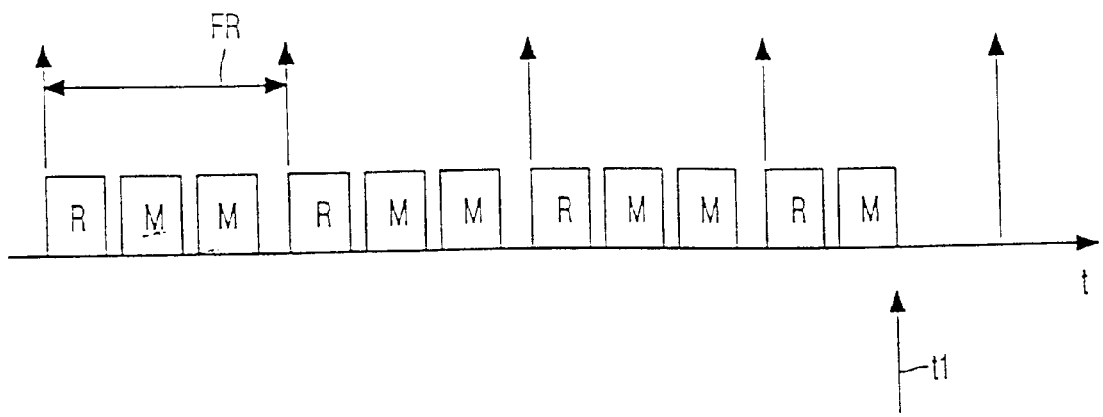
FIG. 6 shows a prior art timing diagram for carrying out power measurements.

FIG. 6 shows a prior art timing diagram for carrying out power measurements. In said Chapter 6.6 and 6.6.1 of the Draft European Telecommunication Standard ETS 300 578, it is specified how a mobile shall monitor neighbour BCCH carriers whilst in idle mode. In the example given, the mobile radio station MS1, served by the radio base station BS1, has already done initial cell selection and is in idle mode. It shall therefore monitor its neighbouring base stations. In GSM, a paging block is four frames. In Chapter 6.6.1, it is specified that mobile shall perform at least 7 power measurements. Usually, two such power measurements are carried out per frame, evenly spread over the frames. In FIG. 6, receiving paging messages is indicated with "R", and measuring by the RSSI 29 as controlled by the unit 28, with "M". With the prior art measurement scheme, the mobile radio station can only adopt its power down mode at t=t1.

Figure 7:
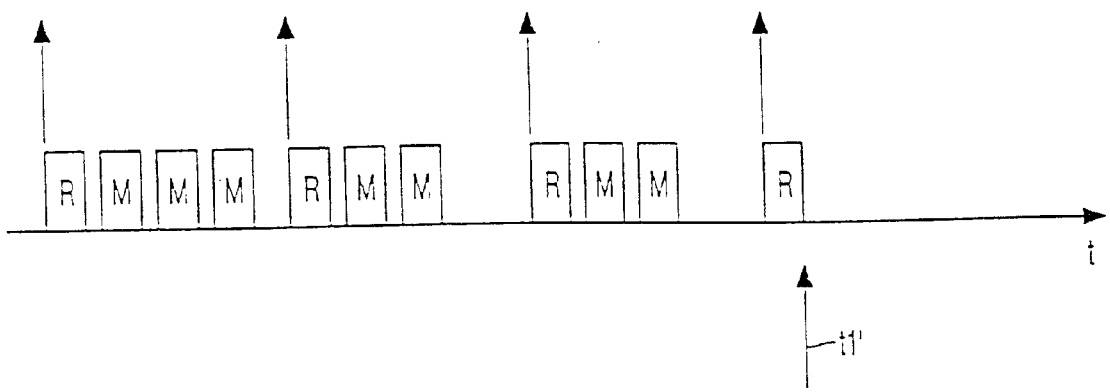
FIG. 7 shows a timing diagram illustrating the power consumption reduction method according to the present invention.

FIG. 7 shows a timing diagram illustrating the power consumption reduction method according to the present invention. More measurements are squeezed in earlier frames than the last frame of the paging block, within the stabilizing capability of the frequency synthesizer 30 whilst avoiding carrying out in the last frame of the paging block received in the paging channel PCH. This can be done because synthesizer stabilizing requirements are less severe when making power measurements than when performing an equalisation task, i.e. for the purpose of making power measurements the synthesizer is quicker in a stable situation while still meaningful measurements can be made. The mobile radio station can thus earlier adopt its power down mode, namely at the instant t=t1'. Possibly, the mobile radio station can also adopt its power down mode in between frames of the paging block, during frames which are not completely filled with measurements. Which frame(s) is/are to be fully filled is at choice, as long as it is arranged that the last frame of the paging block is free of measurements.

In view of the foregoing it will be evident to a person skilled in the art that various modifications may be made within the spirit and the scope of the present invention as hereinafter defined by the appended claims and that the present invention is thus not limited to the examples provided.

What is claimed is:

1. In a digital radio system including frequency and time division radio resources, which system comprises at least one radio base station and a plurality of mobile radio stations, a power consumption reduction method comprising the following steps, when a mobile radio station is in idle mode, a) broadcasting to the mobile radio station of system messages informing the mobile radio station about the structure of control channels which include paging channels, b) powering up of the mobile radio station at a start of a block of paging channels intended for it, which block extends over more than one time division multiple access frame, and is a part of a multiframe structure including at least two blocks of paging channels which are timely separated for the same mobile radio station, c) monitoring by the mobile radio station of broadcast channel carriers of its serving cell and a number of broadcast channel carriers of non-serving neighbor cells, by measuring receive field strengths thereof, d) carrying out of non-uniformly spread field strength measurements during the frames preceding a last frame of the intended paging block, and e) powering down of the mobile radio station at least one time slot earlier than would have been needed if the measurements were uniformly spread over the intended paging block.

2. A power consumption reduction method as claimed in claim 1, wherein during a given frame before the last frame of the intended paging block more field strength measurements are carried out than in other frames before the last frame.

3. A mobile radio station for use in a digital radio system including frequency and time division radio resources, which system comprises at least one radio base station and a plurality of mobile radio stations including said mobile radio station, and which system is configured to broadcast to said mobile radio station of system messages informing said mobile radio station about the structure of control channels which include paging channels, said mobile radio station comprising:

means for powering up of said mobile radio station at a start of a block of paging channels intended for it, which block extends over more than one time division multiple access frame, and is a part of a multiframe structure including at least two blocks of paging channels which are timely separated for the same mobile radio station, means for monitoring of broadcast channel carriers of its serving cell and a number of broadcast channel carriers of non-serving neighbor cells, by measuring receive field strengths thereof, means for carrying out of non-uniformly spread field strength measurements during the frames preceding a last frame of the intended paging block, and means for powering down of said mobile radio station at least one time slot earlier than would have been needed if the measurements were uniformly spread over the intended paging block.

4. A mobile radio station for use in a digital radio system including frequency and time division radio resources, which system comprises at least one radio base station and a plurality of mobile radio stations including said mobile radio station, and which system is configured to broadcast to said mobile radio station of system messages informing said mobile radio station about the structure of control channels which include paging channels, said mobile radio station comprising:

a power-up controller for powering up of said mobile radio station at a start of a block of paging channels intended for it, which block extends over more than one time division multiple access frame, and is a part of a multiframe structure including at least two blocks of paging channels which are timely separated for the same mobile radio station, a monitor for monitoring of broadcast channel carriers of its serving cell and a number of broadcast channel carriers of non-serving neighbor cells, by measuring receive field strengths thereof, a measurer for carrying out of non-uniformly spread field strength measurements during the frames preceding a last frame of the intended paging block, and a power-down controller for powering down of said mobile radio station at least one time slot earlier than would have been needed if the measurements were uniformly spread over the intended paging block.

5. A mobile radio device as claimed in claim 4, wherein the measurer is configured to carry out more field strength measurements during a given frame before the last frame of the intended paging block than in other frames before the last frame.

* * * * *